United States Patent [19]

Huang

[11] Patent Number: 5,857,929
[45] Date of Patent: Jan. 12, 1999

[54] TWO PIECE HANDLE GRIP

[76] Inventor: Ben Huang, 19472 Woodlands La., Huntington Beach, Calif. 92648

[21] Appl. No.: 984,917

[22] Filed: Dec. 4, 1997

Related U.S. Application Data

[63] Continuation-in-part of Ser. No. 787,828, Jan. 23, 1997, Pat. No. 5,730,669, and Ser. No. 822,226, Mar. 21, 1997.

[51] Int. Cl.$^6$ .................................................. A63B 49/08
[52] U.S. Cl. ........................................ 473/549; 473/302
[58] Field of Search .................................... 473/549, 300, 473/301, 302, 303

[56] References Cited

U.S. PATENT DOCUMENTS

| | | | |
|---|---|---|---|
| 1,441,986 | 1/1923 | Lard | 473/302 |
| 2,000,295 | 5/1935 | Oldham | 473/301 X |
| 2,003,917 | 6/1935 | Bowden | 473/549 |
| 2,207,062 | 7/1940 | Lamkin | 473/302 |
| 2,836,420 | 5/1958 | Lamkin et al. | 473/302 |
| 3,140,873 | 7/1964 | Goodwin | 473/549 X |
| 3,311,375 | 3/1967 | Onions | 473/549 X |
| 4,567,091 | 1/1986 | Spector . | |
| 5,275,407 | 1/1994 | Soong | 473/549 |
| 5,435,549 | 7/1995 | Chen . | |
| 5,491,015 | 2/1996 | Reeves et al. . | |
| 5,524,885 | 6/1996 | Heo . | |
| 5,624,116 | 4/1997 | Yeh . | |
| 5,634,859 | 6/1997 | Nesbitt . | |
| 5,730,669 | 3/1998 | Huang | 473/549 |

*Primary Examiner*—William E. Stoll
*Attorney, Agent, or Firm*—Fulwider Patton Lee & Utecht, LLP

[57] ABSTRACT

A shock absorbing grip for a golf club or racquet having a two-piece strip formed of a polyurethane layer bonded to a felt layer where one strip segment is wider or equal than the other strip segment. The strip is spirally wrapped about a golf club or racquet handle with the side edges being formed with recessed reinforcement side edges which are overlapped to form a water retarding joint between the side edges of the strip. The strip segments and side edges may be fabricated in contrasting colors to provide a unique decorative appearance.

15 Claims, 9 Drawing Sheets

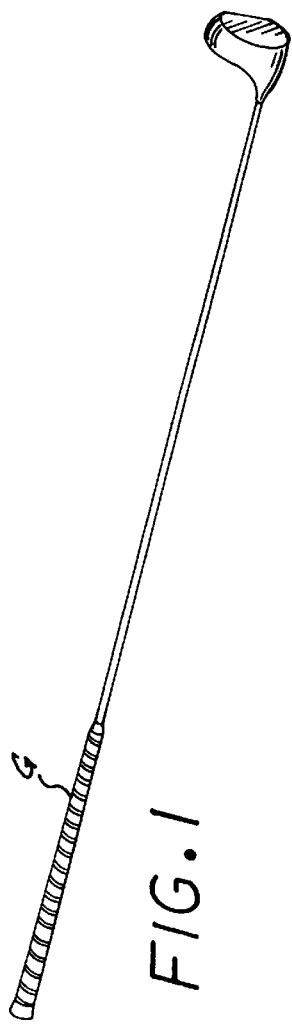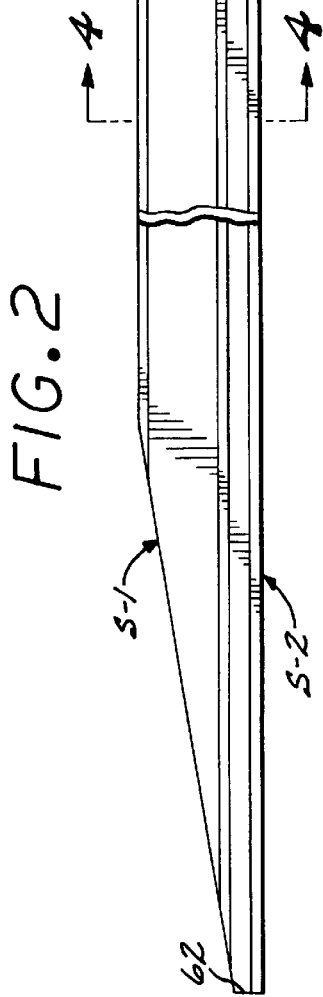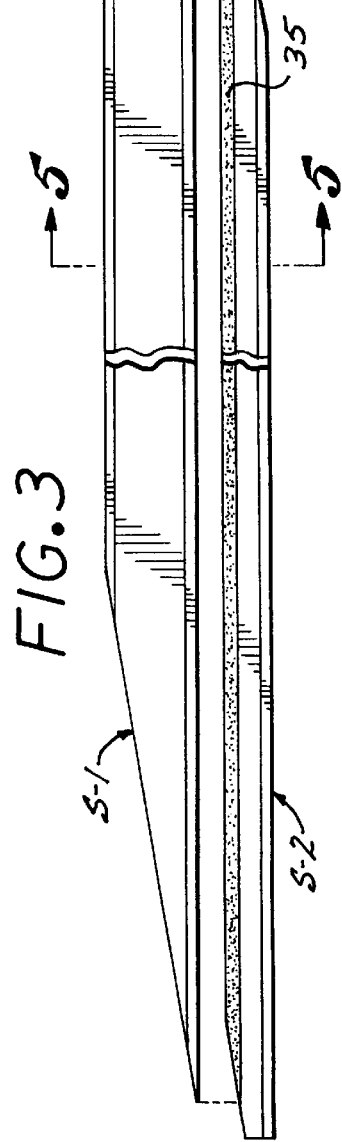

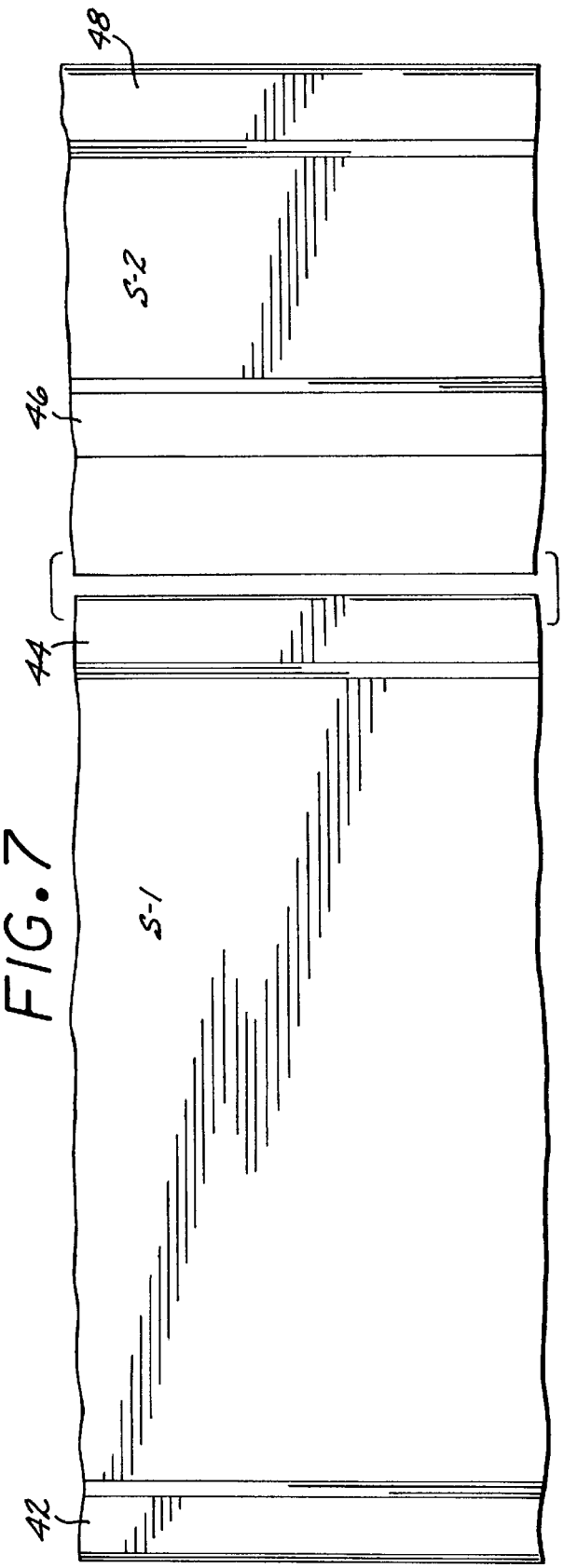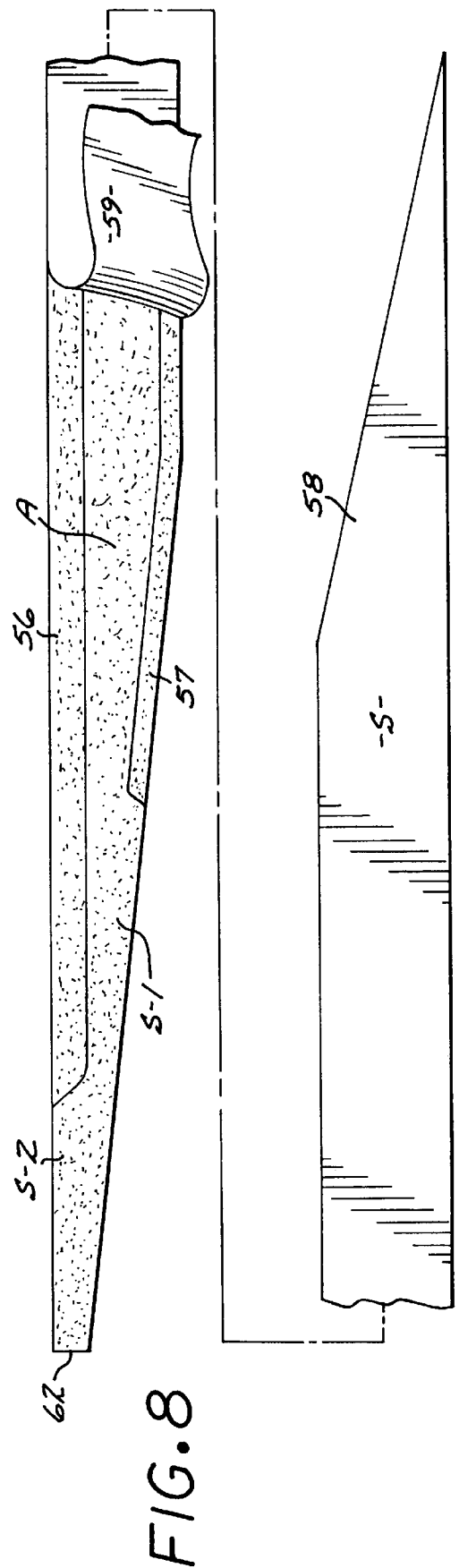

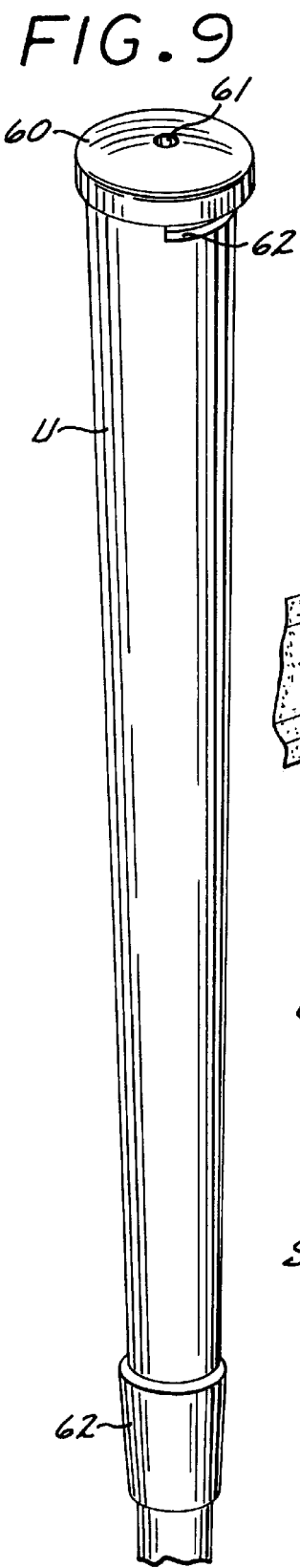
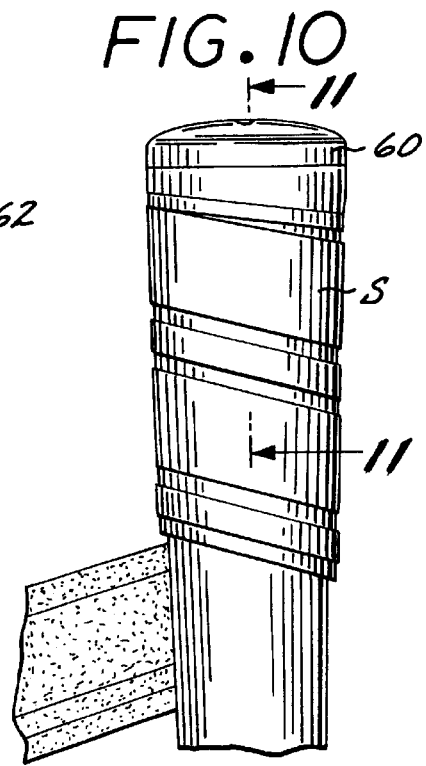
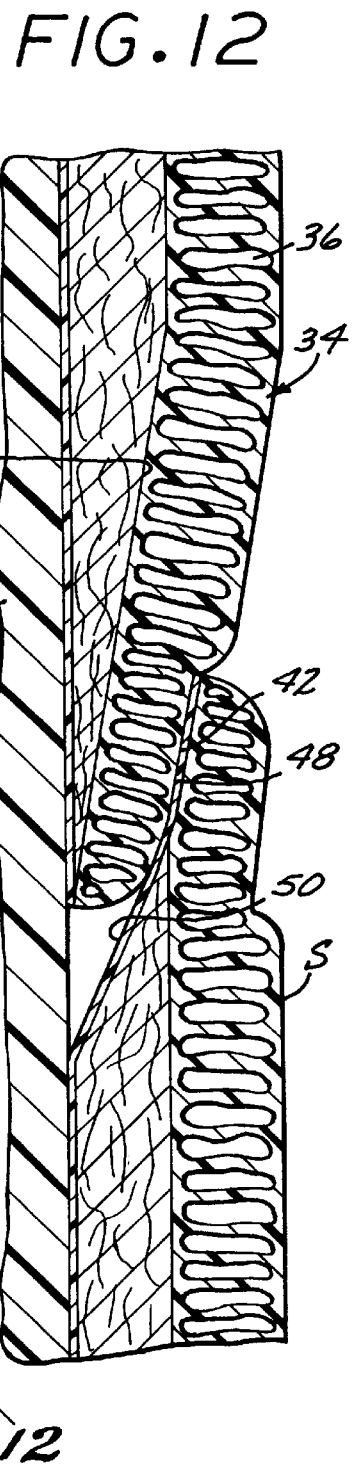
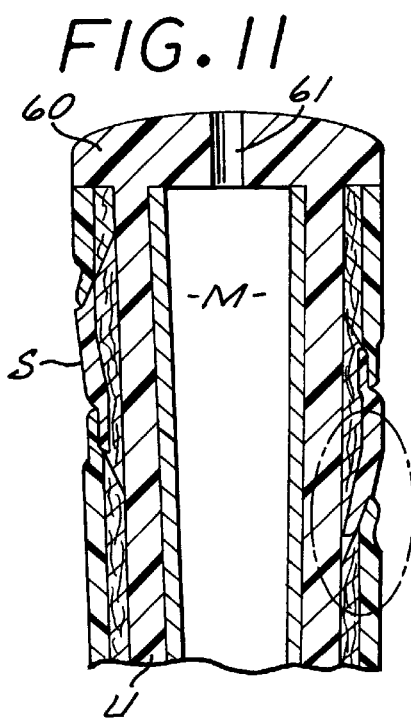

FIG. 13
FIG. 14
FIG. 15
FIG. 16
FIG. 17
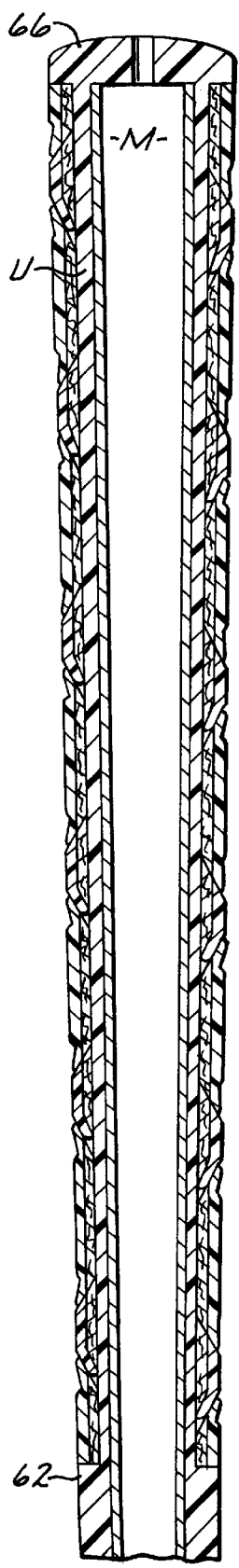
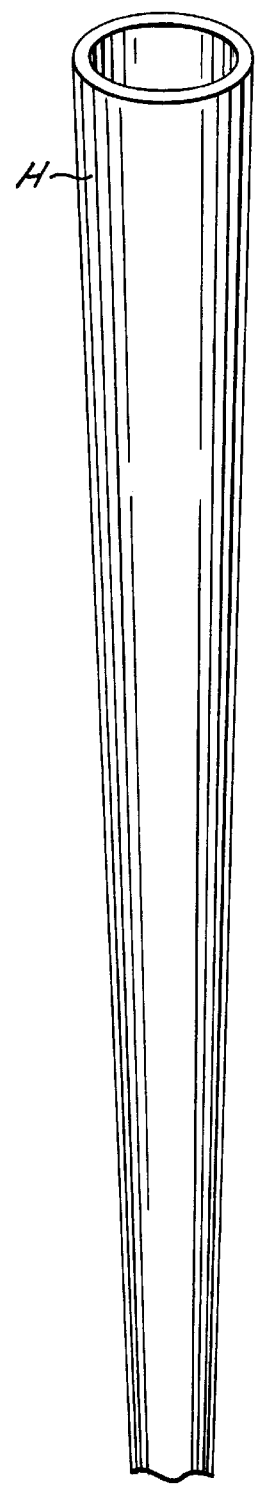
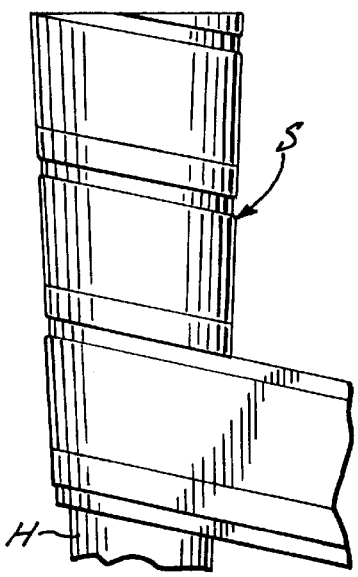
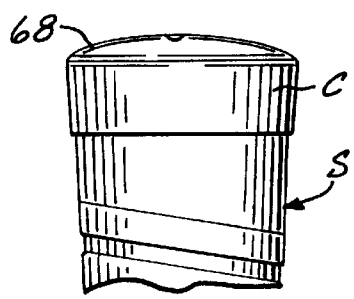
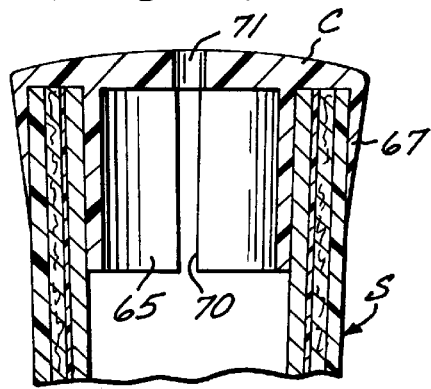

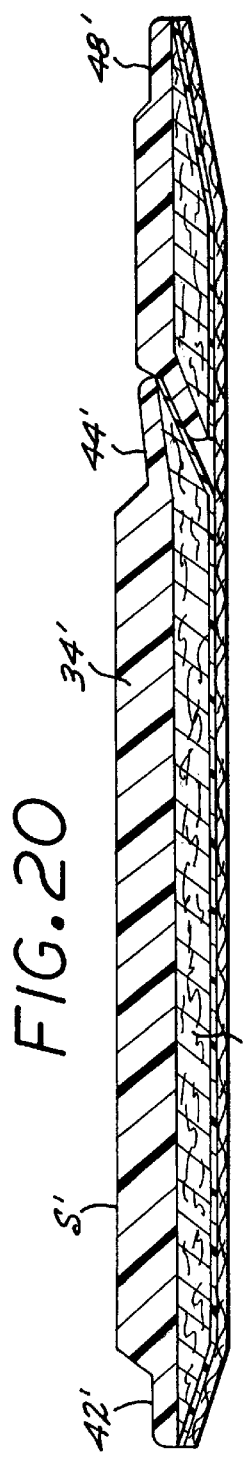
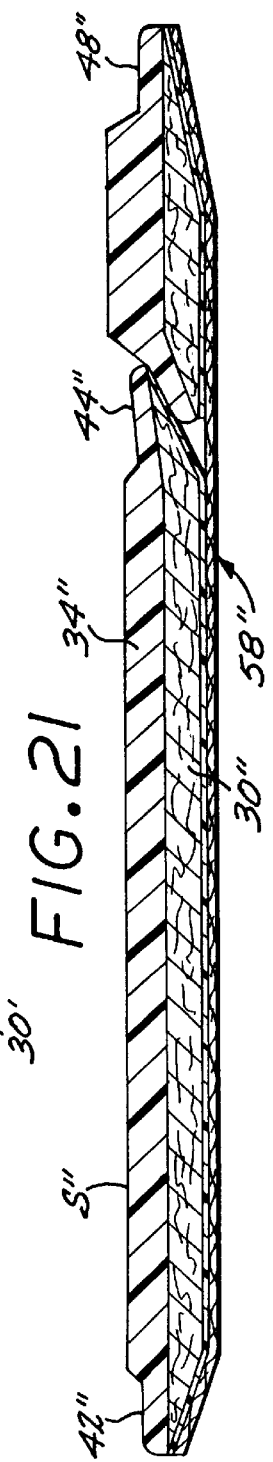
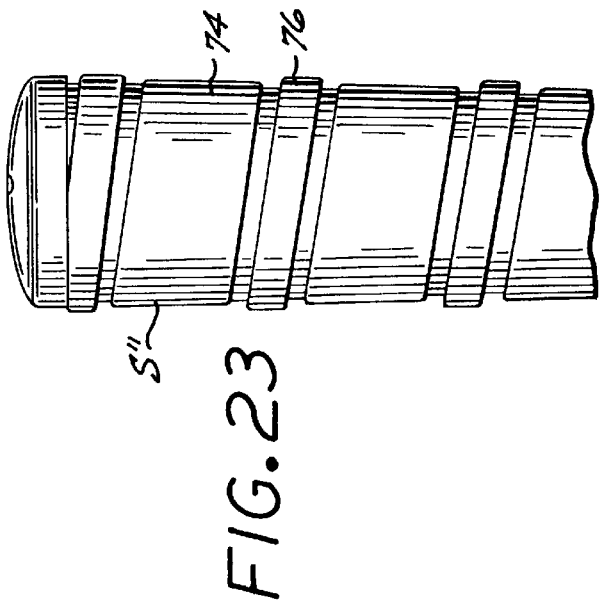
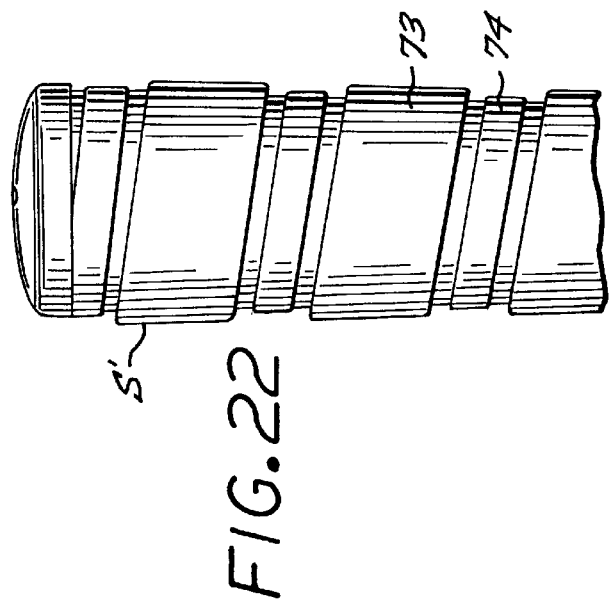

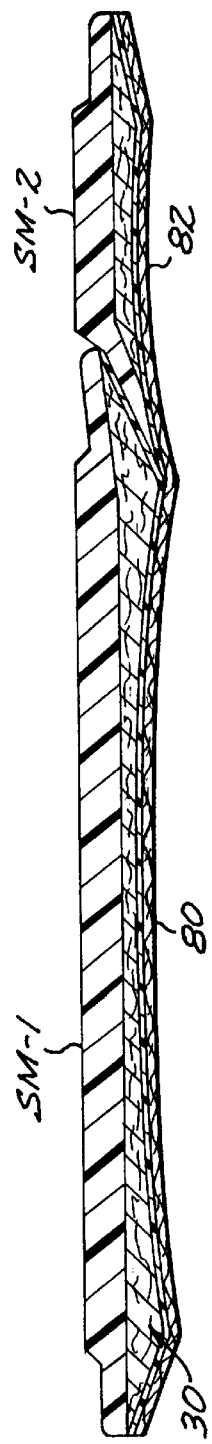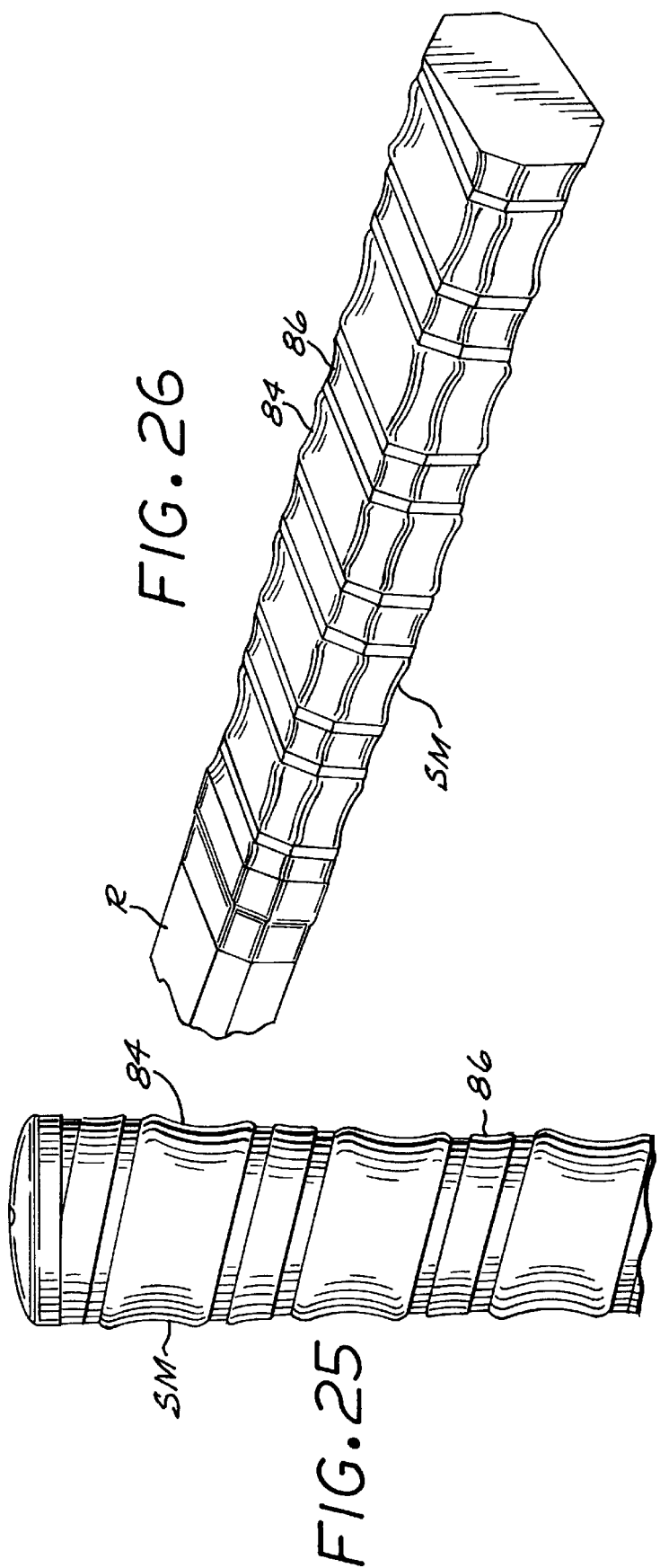

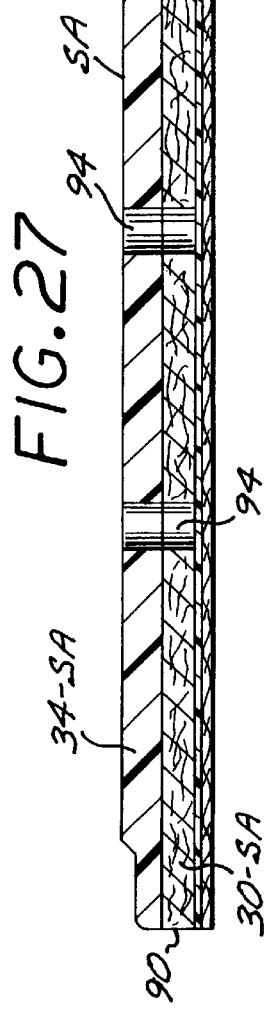
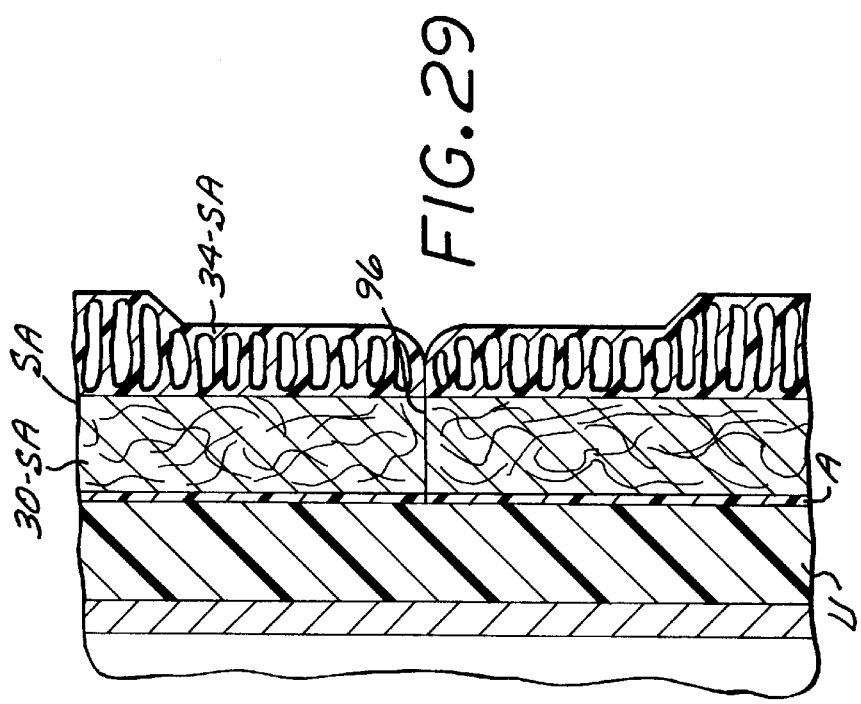
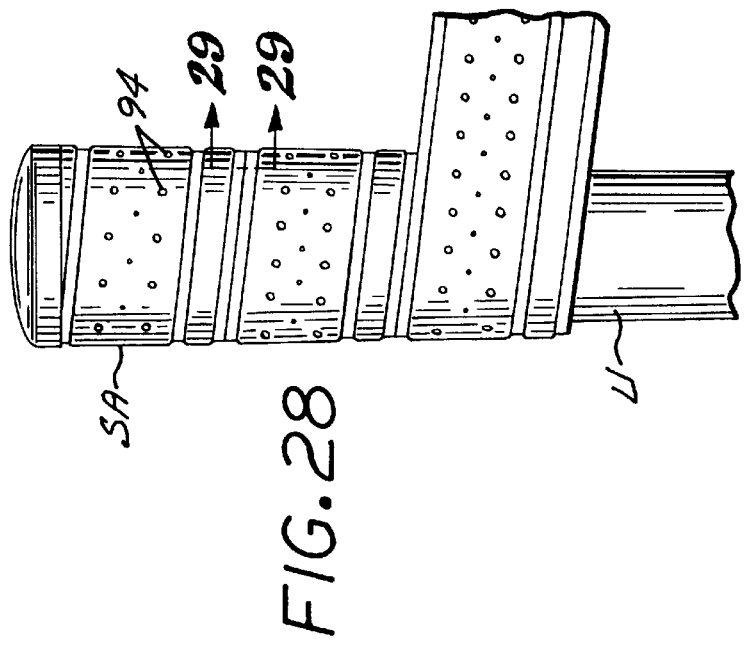

TWO PIECE HANDLE GRIP

This is a continuation-in-part of U.S. patent application Ser. No. 08/787,828 filed Jan. 23, 1997, now U.S. Pat. No. 5,730,669, and also a continuation-in-part of U.S. patent application Ser. No. 08/822,226, filed Mar. 21, 1997, pending.

BACKGROUND OF THE INVENTION

The present invention relates to an improved grip for golf clubs and other sporting equipment employing handles subject to shock when such devices are impacted, as for example, tennis racquets, racquetball racquets, and baseball bats.

It is well known that shock generated by impact between a golf club and a golf ball or a tennis racquet and a tennis ball can adversely affect muscle tissue and arm joints, such as elbow joints. The energy generated by such impact is usually of high frequency and short duration with rapid decay, and which is often known as "impact shock." Tight grasping of a golf club grip or tennis racquet grip to keep it from slipping in a user's hands contributes to such impact shock.

Applicant has previously developed resilient grips which successfully reduce or even eliminate impact shock to the muscle and arm joints of the users of golf clubs and the like. See, for example, applicant's U.S. Pat. No. 5,374,059 and U.S. Pat. No. Re. 35,673. Such earlier grips utilize a polyurethane layer bonded to a felt layer to define a strip which is spirally wrapped around the handle of a golf club or tennis racquet to conform generally to the external configuration of such handle. In earlier grips of applicant's design, the thickness of the polyurethane layer relative to the thickness of the felt layer as compared to prior art resilient grips was a minimum of approximately 0.18, with the thickness of the polyurethane layer having been about equal to or thicker than the thickness of the textile layer in a typical grip of my design. Also, in some of such earlier grips, the side edges of the polyurethane-felt strip tended to unravel in use, and where the strip was not properly applied to a golf club handle, the grip would tend to loosen relative to the handle, particularly, when a golf club was withdrawn from a golf club bag. To overcome these disadvantages, my later grip designs utilized heat-compressed radially inwardly extending reinforcement side edges formed in the polyurethane layer along the length of the strip. The recessed side edges also enhance the frictional grip of a user's hands on the golf club or tennis racquet, and under humid or rainy conditions inhibits water from infiltrating the felt layer. Such moisture tends to build up on the grip which could result in a user's hands slipping relative to the grip with a result in diminished control of the golf club or tennis racquet.

SUMMARY OF THE INVENTION

Applicant has developed an improved grip utilizing a two-piece polyurethane-felt strip, each piece being of a different width in such a manner as to provide important advantages over his above-described earlier grips.

In one embodiment of applicant's grip of the present invention each of the two-pieces and the side edges thereof are of different colors so as to provide a handle grip of a unique decorative appearance. Another embodiment of the two-piece grip of applicant's present invention utilizes two-pieces of differing heights so as to result in a handle grip of varying surface contour offering greater gripping power than smooth-contoured handle grips. Yet another embodiment of a handle grip embodying the present invention utilizes an upwardly extending central groove along the underside of the grip which forms a spiral depression when the strip is spirally wrapped about a handle to further inhibit slippage of a user's hand relative to such grip.

The polyurethane-felt strip of the present invention may be spirally wrapped about a tapered resilient sleeve that has been applied to the handle of a golf club shaft. Alternatively, the strip may be directly spirally wrapped about the handle of a golf club or tennis racquet. The polyurethane-felt strip may also be spirally wrapped about a tapered sleeve while the sleeve is positioned on a collapsible mandrel to provide a slip-on golf club grip that can be applied to a new golf club or can be utilized as a replacement golf grip.

Applicant's grip of the present invention can also provide a long service life, may be manufactured at a low cost, and can be readily installed by a user.

These and other features and advantages of the present invention will become apparent from the following detailed description, when taken in conjunction with the accompanying drawings.

BRIEF DESCRIPTION OF THE DRAWINGS

FIG. 1 is a perspective view of a golf club provided with a grip embodying the present invention.

FIG. 2 is a broken top plan view of a polyurethane-felt strip embodying the present invention before it is wrapped about a golf club shaft.

FIG. 3 is a broken top plan view similar to FIG. 2, but showing first and second pieces which are joined to form the strip of FIG. 2.

FIG. 7 is a view similar to FIG. 6 showing the two-piece construction of FIG. 3.

FIG. 8 is a broken bottom view of the strip of FIG. 2 showing the peel-away tape of the strip of FIG. 2 being pulled away to expose an adhesive.

FIG. 9 is a perspective view of an underlisting sleeve utilized in one embodiment of the invention.

FIG. 10 is a broken side elevational view showing the strip of FIG. 2 being spirally wrapped around the underlisting sleeve of FIG. 9.

FIG. 11 is a vertical sectional view taken in enlarged scale along line 11—11 of FIG. 10.

FIG. 12 is a further enlarged vertical sectional view of the area designated 12 in FIG. 11.

FIG. 13 is a broken vertical sectional view showing a collapsible mandrel supporting the underlisting sleeve of FIGS. 9–11 while a polyurethane-felt strip embodying the present invention is wrapped around such underlisting sleeve.

FIG. 14 is a broken perspective view showing a golf club shaft adapted to directly receive the polyurethane-felt strip embodying the present invention.

FIG. 15 is a broken side elevational view of a polyurethane-felt strip of the present invention being wrapped around the golf club shaft of FIG. 14.

FIG. 16 is a broken elevational view of a cap applied to the upper end of the golf club shaft of FIG. 14 after the strip has been wrapped therearound.

FIG. 17 is a vertical sectional view taken in enlarged scale showing the cap of FIG. 16.

FIGS. 20 and 21 are vertical sectional views similar to FIGS. 4 and 5 showing two other embodiments of a two-piece strip embodying the present invention.

FIGS. 22 and 23 are broken side elevation views showing the strip of FIGS. 20 and 21, respectively, spirally wrapped about the handle of a golf club.

FIG. 24 is a vertical cross-sectional view similar to FIG. 4 showing another embodiment of a handle grip embodying the present invention formed with an upwardly extending groove on the underside of the felt layer.

FIG. 25 is a broken vertical sectional view showing the grip of FIG. 24 spirally wrapped about a golf club handle.

FIG. 26 is a perspective view showing the strip of FIG. 24 spirally wrapped about the handle of a tennis racquet.

FIG. 27 is a vertical cross-sectional view similar to FIGS. 4 and 24 showing yet another embodiment of a handle grip embodying the present invention wherein the side edges of the grip are arranged in a tightly abutting configuration.

FIG. 28 is a broken side elevational view of the handle grip of FIG. 27 being wrapped about an underlisting sleeve.

FIG. 29 is a vertical sectional view taken in enlarged scale along lines 29—29 of FIG. 28.

DETAILED DESCRIPTION OF PREFERRED EMBODIMENTS

Figure 19:
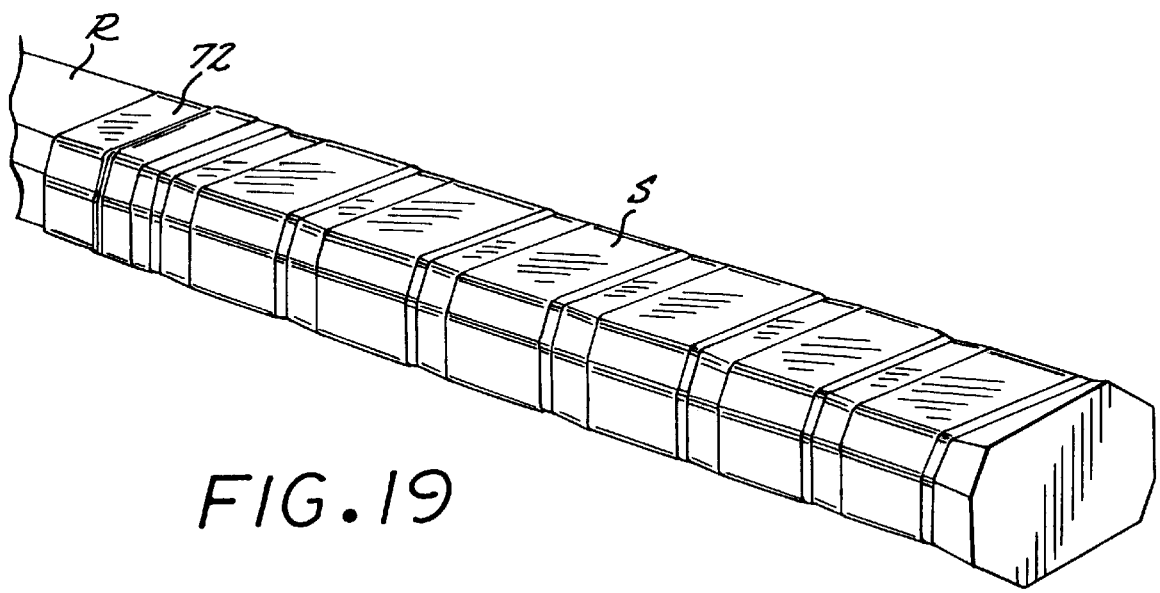
FIG. 19 is a perspective view taken in enlarged scale showing a grip of the present invention as installed on the handle of a tennis racquet.

Referring to the drawings, a preferred grip G embodying the present invention utilizes an elongated two-piece resilient strip S which is spirally wrapped about a golf club handle as shown in FIG. 1, or a tennis racquet handle as shown in FIG. 19. The strip S is fabricated from first and second individual segments S1 and S2 of different widths, with strip S1 being wider than strip S2. Segments S1 and S2 each include an open-pored felt bottom layer, generally designated 30, having an inner or bottom surface 32 which is adhered to either an underlisting sleeve attached to a golf handle, to a bare golf club handle or to a tennis racquet handle. Each segment S1 and S2 also includes a top layer of suitable resistant plastic material, such as a smooth close-pore polyurethane layer generally designated 34, with each polyurethane layer being bonded to its adjacent felt layer. The polyurethane layers are formed with a plurality of pores 36 (FIG. 12). The completed strip S may be formed with vertical air-passing perforations such as shown in my U.S. Pat. No. 5,645,501 issued Jul. 8, 1997, with a plurality of intersecting perforations and dimples such as shown in my U.S. Pat. No. 5,618,041 issued Apr. 8, 1997 or with a plurality of treads, vertical holes and dimples such as shown in my U.S. Pat. No. 5,618,041 to enhance a user's grip on a handle during use of the golf club or tennis racquet upon which the handle is mounted.

The polyurethane layer of each strip segment may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat. In this manner, the pores 36 are formed, while the underside of the polyurethane layers are bonded to the upper surface of the felt layers. As noted hereinbefore, applicant has discovered that greatly improved shock absorbing qualities may be obtained in a racquet grip or golf club grip where the thickness of the polyurethane layer to the thickness of the felt layer is increased over the thickness of the felt layer employed in prior art grips. More specifically, the thickness ratio of the major portion of the polyurethane layer/textile layer should preferably be equal to or larger than approximately 1.08, although the ratio of the thickness of the polyurethane layer to the textile layer can be a minimum of approximately 0.06 for golf club grips used by low-handicap golfers. In the embodiment shown in FIGS. 4 and 5, the thickness of the polyurethane layer is preferably about 0.4 millimeters and the thickness of the felt layer is about 0.9 millimeters. Excellent results have also been obtained with this ratio.

The polyurethane layer provides a cushioned grasp of the player's hand on a golf club or tennis racquet handle and also enhances the player's grip by providing increased tackiness between the player's hand and the grip. The felt layer provides strength to the polyurethane layer and serve as a means for attaching the bonded-together polyurethane and felt strip to a handle or underlisting sleeve.

Figure 4:
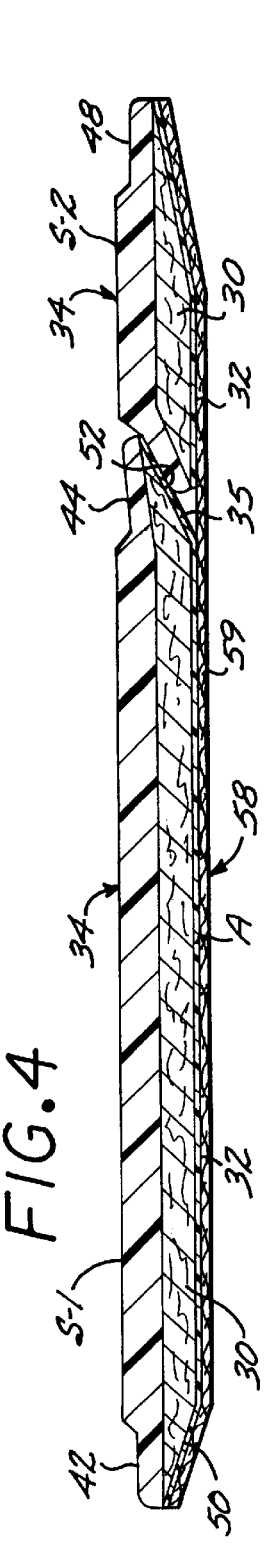
FIG. 4 is a vertical sectional view taken in enlarged scale along line 4—4 of FIG. 2.
Figure 5:
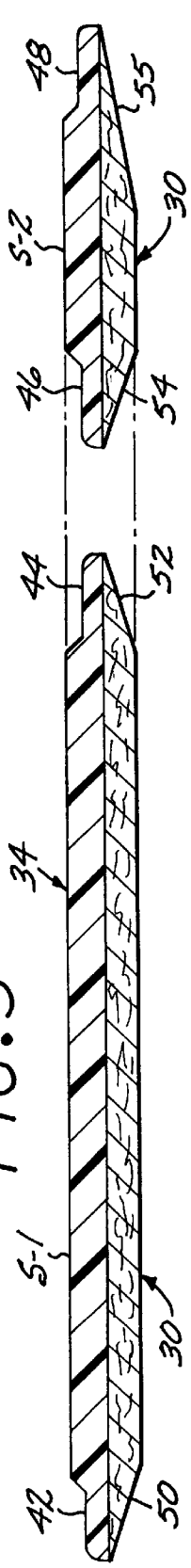
FIG. 5 is a vertical sectional view taken in enlarged scale along line 5—5 of FIG. 3.

FIG. 2 is a top plan view of the strip S after strip segments S1 and S2 have been adhered together and the strip has been cut to the proper plan configuration and dimensions to be wrapped around the golf club handle of FIG. 1. FIG. 3 shows the two strip segments S1 and S2 before they have been adhered together by an adhesive 35 along one of their side edges to define the strip S. Adhesive 35 may be applied by means of a conventional quick-release peel-off tape (not shown). After the strip segments have been adhered together, and cut to the proper plan configuration, the strip segment S1 is formed with sidewardly and outwardly extending reinforced recessed side edges 42 and 44, and strip segment S2 is formed with similar reinforced recessed side edges 46 and 48, as shown in FIGS. 4 and 5. Such reinforced side edges may be formed by means of a heated platen (not shown) as described in my U.S. Pat. No. 5,730,699 issued Mar. 24, 1998 on application Ser. No. 08/787,828 filed Jan. 23, 1997. Alternatively, such reinforcement side edges may be formed by heated rollers in the manner described in my U.S. patent application Ser. No. 08/940,796 filed Sep. 30, 1997. Simultaneous application of heat and pressure by means of a platen or heated rollers compresses the polyurethane layer of strip segments S1 and S2 to thereby increase the density and strength of the polyurethane layer in the vicinity of the side left and right hand side edges of the strip segments.

After the reinforcement side edges 42, and 44 have been formed in the wider strip segment S1, the side edges of its felt layer are skived to form outwardly and upwardly side edges 50 and 52, as shown in FIGS. 4 and 5. Additionally, the left and right hand sides of shorter strip segment S2 are skived to form outwardly and upwardly slanted side edges 54 and 55. Preferably, slanted side edge 50 of strip segment of S1 will be shorter than slanted side edge 55 formed on the outer side edge of strip segment S2, for reasons to be set forth hereinafter, e.g. side edge 50 may be 2–3 millimeters while side edge 55 may be about 5 millimeters.

As shown in FIG. 4, to adhere the facing sides of segments S-1 and S-2 together, the left recessed side edge 46 of segment S-2 is deflected downwardly to receive the slanted side edge 52 of segment S-1.

After the segments S-1 and S-2 have been adhered together, the underside of the outer edges at the starting end of the strip S (relative to the handle's butt end) will be skived to provide outwardly and downwardly slanted leading and starting edges 56 and 57, as shown in FIG. 8. When the strip S is spirally wrapped about the butt of a handle, such slanted starting edges permit a smooth configuration of the strip on the handle.

Referring now to FIGS. 4, 5 and also 8, the underside of the felt layers 30 are coated with an adhesive A. Such adhesive may be coated on the upper surface of a conventional quick-release peel-off tape generally designated 58. The lower tape element 59 of the peel-off tape 58 is pulled off the adhesive A to affix the completed strip S to an underlisting sleeve, a bare golf club handle or a tennis racquet handle.

Referring now to FIGS. 9–13, there is shown a resilient rubber-like underlisting sleeve U which receives strip S to form the slip-on version of the grip of the present invention. The underlisting sleeve U is fabricated of synthetic plastic foam or rubber utilizing an integral cap 60 having a vent aperture 61. The lower portion of the underlisting sleeve U is formed with a guide cylinder 62. Below the cap 60, the upper portion of sleeve U is formed with a groove 62 to receive the starting end 63 of strip S. Underlisting sleeve U is removably disposed upon a conventional collapsible mandrel M (FIG. 13) before strip S is spirally wrapped about the sleeve to provide a slip-on grip embodying the present invention. Alternatively, a similar underlisting sleeve U (not shown) is adhered to golf club shaft before strip S is spirally wrapped about such shaft in the manner shown and described in my U.S. Pat. No. 5,584,482. To apply the strip S to either of the underlisting sleeves, the quick-release tape element 59 is peeled off the adhesive A on the underside of the felt layers 30. The strip S is then spirally wound around the sleeve starting with the upper end of the sleeve. The tip of the strip's starting end is inserted in groove 62 of the sleeve and the strip is wrapped about 1½ times around the upper or butt end of the sleeve to provide a smooth configuration of the strip on the sleeve, as shown in FIGS. 10 and 11. It is important to note that when strip S is spirally wrapped about the underlisting sleeve the underside of the recessed side edges 42 and 48 of the polyurethane layers overlap one another, with such edges being secured together in a watertight manner by adhesive 57. The provision of the slanted side edges 50 and 55 of the felt layer 30 permits such overlapping of the recessed side edges 42 and 48. The use of slanted side edges 50 and 55 having different widths permits a more pleasing longitudinal profile of the completed grip while the narrower slanted side edge 50 reduces the amount of felt cut off the felt layer thereby maintaining the strength of the completed strip S.

It should be understood that if the strip S is spirally wrapped around underlisting sleeve U while the sleeve is supported on collapsible mandrel M, after the strip has been spirally wrapped around the sleeve, the mandrel is collapsed and the sleeve and strip assembly axially withdrawn therefrom. The resulting assembly defines a grip embodying the present invention which may be marketed as a replacement grip or as original equipment installed on a complete golf club (the so-called slip-on grip in the golf industry). When the underlisting sleeve U is slipped over the handle of a golf club, the guide cylinder 62 rigidifies the comparatively flexible lower end of the sleeve U to facilitate slipping the sleeve onto the handle. Referring to FIGS. 14–17, strip S of FIGS. 2 and 4 is shown being spirally wrapped about a bare handle H of a golf club shaft. Handle H may be radially expanded at a greater angle than the main portion of the golf club shaft to enhance the grasp of a golfer. This design is commonly termed a "big butt" shaft in the golf club trade. This arrangement eliminates the need of an underlisting sleeve thereby effecting a weight reduction as compared to standard grips. In FIG. 15, the strip S is shown being spirally wrapped around the handle portion of the shaft H in the same manner as such strip S is wrapped about the underlisting sleeve in FIGS. 10, 11 and 12.

Referring to FIGS. 16 and 17 the upper portion of the shaft handle H is provided with an annular cap C of integral construction. Such cap C includes a vertical inner skirt 65 a vertically tapered outer skirt 67 and a horizontal slightly domed cover 68. Cover C is preferably molded from a stiff synthetic plastic material such as polypropylene, polyethylene or ABS. A vertically extension expansion slot 70 is preferably formed in inner skirt 65. It is desirable that the inner skirt tapers at the same angle as the interior of the shaft H and be tightly telescopically received by the upper open of the shaft. Expansion slot 70 permits a tight fit to be obtained between the inner skirt and the interior of the golf club shaft even where the outer diameter of the inner skirt is slightly greater than the shaft inner diameter. The inner diameter of outer skirt 67 should be so dimensioned that it can tightly telescopically enclose the first wrap of strip S as shown in FIG. 17. It has been determined that an outer skirt depth of about 4 millimeters and an inner skirt depth of about 15 millimeters for a conventional driver affords good results. Cap C is adhesively secured to the upper hand of the golf club shaft after strip S has been spirally wrapped thereabout. The outer skirt 67 extends downwardly a sufficient distance over the upper portion of the wrapped strip to insure the strip does not unravel relative to the shaft when a golf club is being used in play, and particularly when the club is being removed from and returned to a golf bag by contact with the other golf clubs in the bag. The dimension of the outer skirt, however, should not interfere with the golfers grasp of the golf club. Preferably, a vent hole 71 is centrally formed in cap C to permit heated air to escape from the interior of shaft H and preclude the cap being blown off the shaft.

Figure 18:
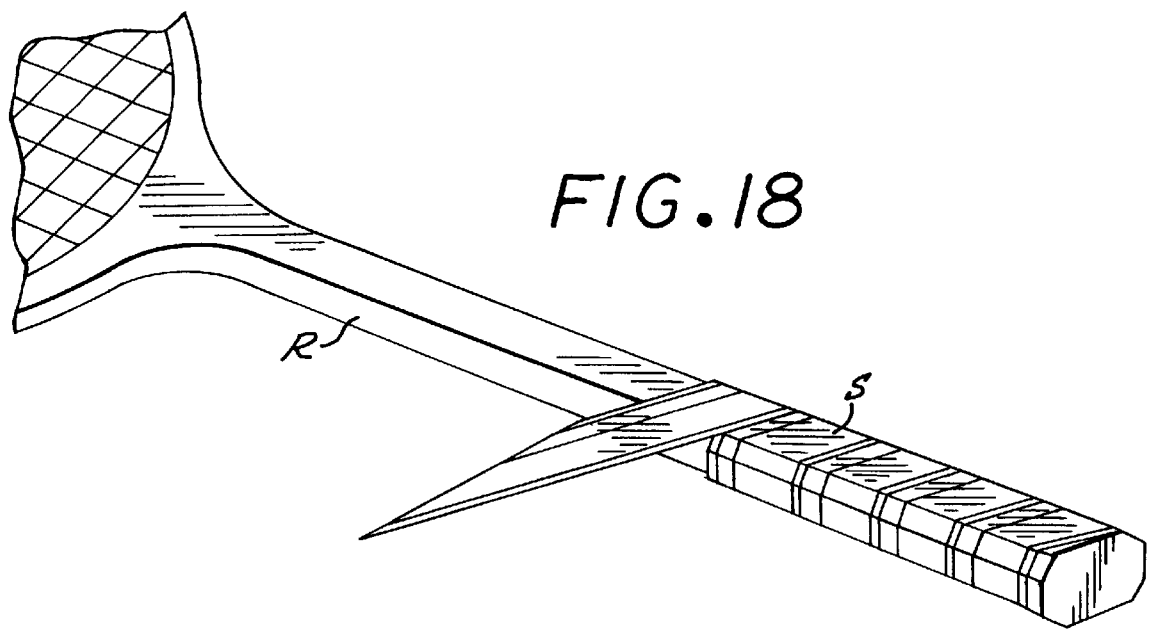
FIG. 18 is a perspective view showing a polyurethane-felt strip embodying the present invention being applied to a tennis racquet.

Referring now to FIGS. 18 and 19, a strip S embodying the present invention is shown being spirally wrapped about the handle of a tennis racquet R in FIG. 18 in the same manner as when the strip S is wrapped about the underlisting sleeve U or the golf shaft handle. As indicated in FIG. 19 it is desirable that a finishing tape 72 be wrapped about the end of the strip S closest to the racquet head to connect the edge of the strip S to the racquet handle.

Figure 6:
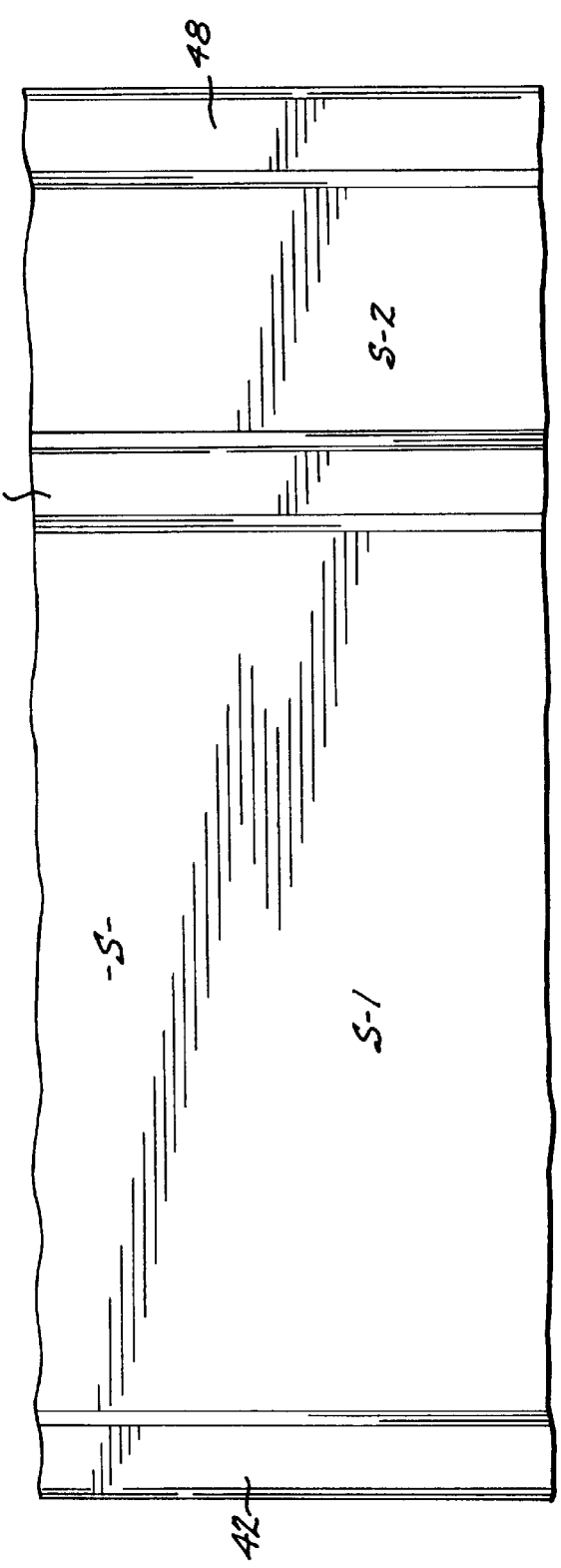
FIG. 6 is a broken top plan view showing a portion of the strip of FIG. 2.

It is a feature of the present invention that the grip S can be fabricated in contrasting colors to provide a handle grip of a unique appearance. Thus, referring to FIGS. 2 and 6, segment S-1 can be molded in a first color while segment S-2 can be molded in a second color that contrasts with the first color. Also, the recessed side edges 42, 44 and 48 may be of a different color or colors than the first and second colors. With this arrangement, a multi-colored grip will result when the strip S is spirally wrapped about an underlisting sleeve, a bare golf club shaft handle or a tennis racquet handle.

Referring to FIG. 20, there is shown a second embodiment of strip S' embodying the present invention. This embodiment is generally similar to the aforedescribed strip S, with the exception that the polyurethane layer 34' of the wider segment S1' is thicker than the polyurethane layer of the shorter segment S-2', e.g. polyurethane layer of segment S1' can be approximately 3.2 millimeters while that of the shorter segment S-2' may be approximately 1.8 millimeters thick. With this arrangement, a clearly defined spiral protrusion 73 that is wider than spiral protrusion 74 is defined by the overlapped first and second strip segments S-1' and S-2' so as to provide greater gripping power for the strip when it is wrapped about a golf club handle or a racquet handle as shown in FIG. 22.

In FIG. 21 there is shown a third embodiment S" of the strip of the present invention wherein the polyurethane layer 34" of the wider strip segment S-1" is of a reduced height as compared to the height of the polyurethane layer of the shorter strip segment S-2". With this arrangement a spiral protrusion 76 of smaller width than protrusion 74 will be formed when the strip S" is wrapped about a golf club handle or a racquet handle as shown in FIG. 23.

Referring now to FIGS. 24–26, there is shown a modified form of strip SM embodying the present invention wherein the underside of the felt layer 30 of wider strip segment SM-1 is further skived to form an upwardly extending groove 80 along its length, while the felt layer of the shorter segment SM-2 is formed with a second upwardly extending groove 82. In other respects, strip SM is similar in construction to the aforedescribed strips.

As shown in FIGS. 25 and 26, when strip SM is spirally wrapped about an underlisting sleeve or the bare handle of a golf club, the groove 80 will form a spirally extending concave depression 84 along the length of the wider strip segments SM-1 and groove 82 will form a spirally extending concave depression 86 along the length of shorter strip segment SM-2. Such depressions increase the surface area of the grip engaged by the user's hands to thereby enhance the frictional contact and hence control of a golf club or tennis racquet by a user. Additionally, a distinctive appearance of the grip is obtained. In FIG. 26, the strip SM is shown spirally wrapped about the handle H of a tennis racquet to form a unique profile similar to that shown in FIG. 25.

Referring now to FIGS. 27, 28 and 29, there is shown another embodiment of a strip SA wherein the side edges of the strip are disposed in a tightly abutting configuration, rather than an overlapped configuration when the strip is spirally wrapped about an underlisting sleeve or a handle. This embodiment is generally similar in construction to the aforedescribed embodiments, except that the outer side edges 90 and 92 of the strip SA extends vertically relative to the lateral axis of the strip, i.e. the outer side edges of the felt layer 30-SA are not slanted. Additionally, strip SA may be formed with vertically extending air-passing perforations 94.

Referring to FIG. 28, strip SA is shown being spirally wrapped about an underlisting sleeve U. As indicated in FIG. 29, the edges of strip SA do not overlap as with the aforedescribed strips and instead butt tightly against one another as shown at 96 so as to provide a smooth overall grip surface preferred by some grip users.

It should be noted that if desired the polyurethane layers of the two strip segments SA-1 and SA-2 may be of different thickness similar to the construction of the aforedescribed strips S' or S".

It will be apparent to those skilled in the art, that various modifications can be made without departing from the spirit and scope of the present invention. By way of example, multi-colored segments and recessed side edges may be employed with the strips S' and S" or SM. Also, the variation in the height of the polyurethane layers of the strip segments shown in FIGS. 20 and 21 may be incorporated with the grooves 80 and 82 of strip SM. Additionally, the two strip segments may be made substantially equal in width, rather than being of different widths. Note also that in the strip embodiments S' and S" of FIGS. 20 and 21 the felt layers may vary in thickness while the thickness of the polyurethane layers remain the same so as to provide a strip having segments of different thickness. Accordingly, it is not intended that the invention be limited except by the appended claims.

What is claimed is:

1. The combination of a handle of an impact imparting device and a resilient grip, comprising:

a strip fabricated from first and second strip segments adhered together along their facing edges, each segment consisting of an open-pored felt layer having a generally flat inner surface and side edges, and a flat closed pore polyurethane layer having its inner surface bonded to the outer surface of the felt layer, and with the felt layer providing strength for the polyurethane layer while the polyurethane layer both absorbs shocks and provides tackiness so as to inhibit slippage of a user's hand relative to a handle;

the segments being of contrasting colors;

an adhesive applied to the underside of the felt layer; and the strip being spirally wrapped about the handle.

2. The combination of claim 1, wherein the thickness of the first strip segment differs from the thickness of the second strip segment.

3. The combination of claim 1, wherein the underside of the felt layer of each strip segment is formed with an upwardly extending groove.

4. The combination of claim 1, wherein heat compressed radially inwardly extending reinforcement recessed outer side edges are formed in the polyurethane layers of both of the strip segments, and outwardly and downwardly slanted side edges are formed along the outer side edges of the felt layer; and the strip being spirally wrapped about the handle with the adjoining recessed side edges overlapping one another to form a water retarding joint.

5. The combination of claim 4, wherein the reinforcement side edges are of a different color than the colors of the major portion of two strip segments.

6. The combination of claim 5, wherein the underside of the felt layers of each strip segment is formed with an upwardly extending groove.

7. The combination of claim 4, wherein additional heat compressed radially inwardly extending recessed side edges are formed on the adjoining portion of the two strip segments and said additional recessed side edges overlap when the two strip segments are adhered together.

8. The combination of claim 7, wherein the underside of the felt layer of each strip segment is formed with an upwardly extending groove.

9. The combination of claim 7, wherein the additional recessed side edges are of a different color than the color of the major portion of the two strip segments.

10. The combination of claim 1, wherein the outer side edges of the felt layer extend generally vertically relative to the lateral axis of such strips, and said outer side edges of the felt layer tightly abut one another when the strip is spirally wrapped about the handle.

11. The combination of a handle of an impact imparting device and a resilient grip, comprising:

a strip fabricated from first and second strip segments adhered together along their facing edges, each segment consisting of an open-pored felt layer having a generally flat inner surface and side edges, and a flat closed pore polyurethane layer having its inner surface bonded to the outer surface of the felt layer, and with the felt layer providing strength for the polyurethane layer while the polyurethane layer both absorbs shocks and provides tackiness so as to inhibit slippage of a user's hand relative to a handle;

heat compressed radially inwardly extending reinforcement side edges formed in the polyurethane layer of the strip along the length of the strip;

outwardly and downwardly slanted side edges formed along the length of the felt layer;

an adhesive applied to the underside of the felt layer; and the strip being spirally wrapped about the handle with the underside of adjoining recessed side edges overlapping one another to form a water retarding joint between the adjoining side edges.

12. The combination of claim 11, wherein the thickness of the first segment differs from the thickness of the second segment.

13. The combination of claim 11, wherein the undersides of the felt layer of each strip segment is formed with an upwardly extending groove.

14. The combination of claim 11, wherein additional heat compressed radially inwardly extending recessed side edges are formed on the adjoining portion of the two strip segments and said additional recessed side edges overlap when the two strip segments are adhered together.

15. The combination of claim 11, wherein the thickness ratio of the major portion of the polyurethane layer/textile layer ratio is equal to or larger than approximately 0.18.

* * * * *